United States Patent [19]

Bronstein-Bonte et al.

[11] 4,340,522
[45] Jul. 20, 1982

[54] PROCESS FOR PREPARING CATIONIC POLYMERS

[75] Inventors: Irena Y. Bronstein-Bonte, Newton; Edward P. Lindholm, Boston, both of Mass.

[73] Assignee: Polaroid Corporation, Cambridge, Mass.

[21] Appl. No.: 142,637

[22] Filed: Apr. 22, 1980

[51] Int. Cl.³ .............................................. C08L 39/08
[52] U.S. Cl. ................................. 524/766; 526/212; 524/767
[58] Field of Search ............... 260/29.6 HN; 526/210, 526/211, 212, 265

[56] References Cited

U.S. PATENT DOCUMENTS

| | | | |
|---|---|---|---|
| 3,148,061 | 9/1964 | Haas | 96/29 |
| 3,553,180 | 1/1971 | Cleary | 526/212 |
| 3,698,896 | 10/1972 | Abbott | 96/3 |
| 3,709,690 | 1/1973 | Cohen | 96/67 |
| 3,758,445 | 9/1973 | Cohen | 260/78 SC |
| 3,770,439 | 11/1973 | Taylor | 96/77 |
| 4,009,031 | 2/1977 | Carlson | 96/29 D |
| 4,080,346 | 3/1978 | Bedell | 260/17 A |
| 4,190,717 | 2/1980 | Suzuki | 526/262 |

FOREIGN PATENT DOCUMENTS 807488  1/1959  United Kingdom .

*Primary Examiner*—Paul R. Michl
*Attorney, Agent, or Firm*—Louis G. Xiarhos

[57] ABSTRACT

A process for preparing a solution of a copolymer of a vinylpyridine and an ethylenically-unsaturated copolymerizable vinylbenzyl quaternary salt is disclosed. The process comprises polymerizing, in the presence of a polymerization medium comprising water and a lower alcohol, a vinylpyridine and a copolymerizable vinylbenzyl quaternary ammonium salt having the formula

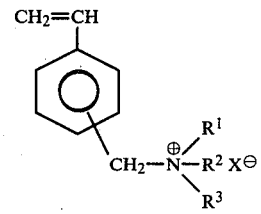

wherein each of $R^1$, $R^2$ and $R^3$ is independently alkyl; substituted alkyl; cycloalkyl; aryl; aralkyl; alkaryl, or at least two of $R^1$, $R^2$ and $R^3$ together with the quaternary nitrogen atom to which they are bonded complete a saturated or unsaturated, substituted or unsubstituted nitrogen-containing heterocyclic ring. The process provides the desired copolymer in the form of a clear solution useful in the formation of polymeric coatings or layers utilized as image-receiving layers in photographic products and processes.

24 Claims, No Drawings

PROCESS FOR PREPARING CATIONIC POLYMERS

BACKGROUND OF THE INVENTION

This invention relates to a process for preparing a cationic polymer. More particularly, it relates to a process for preparing a copolymer of a vinylpyridine and a vinylbenzyl quaternary ammonium salt in the form of a solution.

The preparation of cationic polymers by the polymerization of one or more ethylenically-unsaturated polymerizable cationic compounds has been known. The preparation of such polymers is described, for example, in Great Britain Pat. No. 807,488 (published Jan. 14, 1959) and in U.S. Pat. No. 4,190,717 (issued Feb. 26, 1980). In general, such polymers may be prepared by resort to bulk polymerization technique, by aqueous emulsion polymerization or by solution polymerization in a suitable organic solvent. The choice of a particular method of polymerization will frequently be dictated by the nature of the particular monomeric or comonomeric species desirably polyermized or by the physical or other properties required in the polymeric product to suit particular applications.

Cationic polymer materials have, for example, been utilized as mordanting materials in various photographic products and processes for the mordanting or fixing of dye image-forming materials. Typically, a mordant polymer will be desireably utilized in the form of a polymeric layer on a suitable substrate or support material and will be formed by coating the support with a coating composition containing the polymeric mordant material. Depending upon the particular polymerizable compound or compounds forming the polymeric mordant and the method utilized in the manufacture thereof, the polymeric mordant material may have certain disadvantageous properties. These properties may adversely affect coatability of the polymeric material. Thus, a polymeric material otherwise suited to application as a mordant material in photographic products or processes, may exhibit non-homogeneity or high viscosity. Additionally, precipitation of the polymer from a coating composition may adversely affect materials handling and coating of the polymeric material. Efforts directed toward the aqueous copolymerization of a vinylpyridine and certain ethylenically-unsaturated vinylbenzyl quaternary salts have been found to result in the production of a polymeric product of milk-like appearance and high viscosity. The tendency of the copolymeric product to undergo phase separation upon standing may also be observed. It will be appreciated that a process for the production of such copolymeric product in the form of a solution exhibiting characteristic homogeneity or uniformity will be especially advantageous from the standpoint of facilitating materials handling and measuring and the production of coatings of the polymeric material.

SUMMARY OF THE INVENTION

It has been found that a solution of a copolymeric product comprising recurring units from a vinylpyridine and recurring units from a vinylbenzyl quaternary ammonium salt can be prepared by conducting the copolymerization of the comonomeric vinylpyridine and vinylbenzyl quaternary ammonium salt compounds in a solvent medium comprising water and a lower alcohol. The present invention, thus, provides a process which comprises forming a solution, in a solvent medium comprising water and a lower alcohol, of a mixture of copolymerizable monomers comprising a vinylpyridine and an ethylenically-unsaturated copolymerizable vinylbenzyl quaternary ammonium salt having the formula:

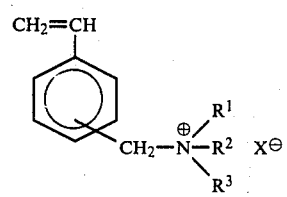

FORMULA I wherein each of $R^1$, $R^2$ and $R^3$ is independently alkyl; substituted-alkyl; cycloalkyl; aryl; aralkyl, alkaryl; or at least two of $R^1$, $R^2$ and $R^3$ together with the quaternary nitrogen atom to which they are bonded complete a saturated or unsaturated, substituted or unsubstituted nitrogen-containing heterocyclic ring; and X is an anion; and polymerizing said mixture of said comonomers in said solvent medium, thereby to form in solution a copolymer of said mixture of copolymerizable monomers.

It has been found that the utilization of an aqueous alcohol polymerization medium comprising water and a lower alcohol permits the polymerization of a mixture of the aforesaid comonomers with the production of a product exhibiting uniformity, stability against phase separation and adapted to utilization in the formation of polymeric coatings or layers on a suitable support material.

DETAILED DESCRIPTION OF THE INVENTION

As indicated previously, the present invention is directed toward a process for providing a solution of a copolymer of a vinylpyridine and a copolymerizable vinylbenzyl quaternary ammonium salt represented by Formula I. The process can be conveniently effected by forming a solution of the copolymerizable vinylpyridine and vinylbenzyl quaternary ammonium salt monomers in an aqueous alcohol polymerization medium and, thereafter, effecting the polymerization thereof with formation of the desired solution of copolymer.

The aqueous alcohol medium utilized for the conduct of the process of the invention comprises water and a lower alcohol such as methanol, ethanol, isopropanol or the like. In general, the vinylbenzyl quaternary salt utilized in the polymerization, and represented by Formula I, will be water soluble. The vinylpyridine monomer tends to be insoluble or only slightly soluble. Sufficient alcohol should be utilized to effect solubilization of the vinylpyridine monomer so as to facilitate production of the desired copolymeric product in soluble form. The relative proportions of water and alcohol can vary depending upon the particular monomers utilized. Such proportions should, however, be sufficient to effect the formation in the aqueous alcohol medium of a solution of the copolymerizable monomers. It will be appreciated the utilization of an amount of alcohol substantially greater than is required to effect solubilization of the vinylpyridine comonomer will generally be avoided in the interests of minimizing the amount of alcohol to be removed and/or recovered from the solution of copolymer provided by the process of the invention. A suitable aqueous alcohol mixture comprises a mixture of water and alcohol in weight proportions, respectively, of from about 0.5:1 to about 9:1. Preferably, a mixture in the ratio of from about 2:1 to about 5:1 will be employed and provides a stable copolymeric solution of uniform reproducibility. At the same time, solvent removal and/or recovery can be conveniently effected. Especially preferred is a mixture of water and ethanol at a ratio of about 4:1.

The formation of a solution of the copolymerizable monomers hereof can be effected in any convenient manner. For example, the vinylpyridine comonomer and the vinylbenzyl quaternary ammonium salt comonomer can be solubilized in alcohol and water can be added so as to provide the desired aqueous alcohol polymerization medium. The polymerization can then be initiated utilizing a conventional polymerization initiator for conduct of the desired polymerization. Alternatively, the aqueous alcohol medium can be premixed and utilized as the polymerization medium to which the respective comonomers are added, sequentially or simultaneously, for solubilization therein.

As indicated previously, the process of the present invention can be utilized for the production of solutions of copolymers of a vinylpyridine comonomer and a copolymerizable vinylbenzyl quaternary ammonium salt comonomer represented by the formula:

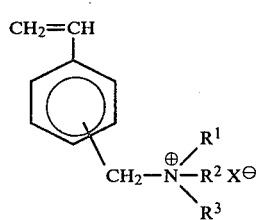

wherein each of $R^1$, $R^2$, $R^3$ and X have the meanings hereinbefore ascribed.

The nature of the vinylbenzyl quaternary ammonium salt compounds of Formula I, and of the corresponding recurring units of the copolymers prepared by the process of the invention, can vary with nature of the $R^1$, $R^2$ and $R^3$ groups thereof. Thus, the $R^1$, $R^2$ and $R^3$ substituents on the quaternary nitrogen atom of the compounds of Formula I can each be alkyl (e.g., methyl, ethyl, propyl, butyl); substituted-alkyl (e.g., hydroxyethyl, hydroxypropyl); cycloalkyl (e.g., cyclohexyl); aryl (e.g., phenyl, naphthyl); aralkyl (e.g., benzyl); or alkaryl (e.g., tolyl). Preferred $R^1$, $R^2$ and $R^3$ groups include alkyl, such as alkyl groups of from 1 to about 8 carbon atoms, cyclohexyl and benzyl. Especially preferred compounds represented by Formula I are those wherein each of $R^1$, $R^2$ and $R^3$ is the same alkyl group such as methyl. Other preferred compounds that can be utilized in the process hereof include, for example, those wherein $R^1$ and $R^2$ are each alkyl, e.g., methyl, and $R^3$ is cyclohexyl.

As indicated previously, the groups $R^1$, $R^2$ and $R^3$ of the compounds of Formula I, and of the corresponding recurring units of the copolymer prepared therefrom, can complete with the quaternary nitrogen atom a nitrogen-containing heterocyclic ring. The nitrogen-containing heterocyclic ring can comprise a saturated or unsaturated ring and, additionally, can be a substituted or unsubstituted heterocyclic ring. It will be appreciated that the formation of a saturated nitrogen-containing heterocyclic ring will involve two of the $R^1$, $R^2$ and $R^3$ groups while in the formation of an unsaturated nitrogen-containing heterocyclic ring such as 1-pyridyl, each of groups $R^1$, $R^2$ and $R^3$ will be involved. Other examples of suitable nitrogen-containing heterocyclic groups formed with the quaternary nitrogen atom include morpholino and piperidino.

The particular nature of the $R^1$, $R^2$ and $R^3$ substituents of the compounds of Formula I will depend upon the particular properties desired in the resulting copolymer and, particularly, upon any influence of such substituent groups on such properties of the copolymers as solubility, swellability or coatability. The $R^1$, $R^2$, and $R^3$ groups can, as indicated, be the same or different to suit particular applications. Similarly, copolymers comprising recurring units from two or more compounds represented by the structure of Formula I can also be prepared utilizing the process of the present invention. Such copolymers may comprise recurring units from each of differently substituted compounds exhibiting differences in mordanting capability or affinity to dyes or which variously affect desired properties of the resulting copolymers. It will be appreciated that copolymers of this type can be prepared by the polymerization of a vinylpyridine with a mixture of two or more dissimilar ethylenically-unsaturated copolymerizable compounds represented by the structure of Formula I, i.e., a mixture of compounds wherein the $R^1$, $R^2$ and $R^3$ substitution of the respective compounds is different.

The X moiety shown in the compounds represented by the structure of Formula I is an anion such as halide (e.g., bromide or chloride). Other anionic moieties representative of anion X include sulfate, alkyl sulfate, alkanesulfonate, arylsulfonate (e.g., p-toluenesulfonate), acetate, phosphate, dialkyl phosphate or the like. A preferred anion is chloride.

Suitable examples of ethylenically-unsaturated monomers representative of compounds of Formula I useful in the preparation of copolymers of the present invention are vinylbenzyl trimethyl ammonium chloride, vinylbenzyl trihexyl ammonium chloride, vinylbenzyl dimethylcyclohexyl ammonium chloride, vinylbenzyl dimethylbenzyl ammonium chloride, vinylbenzyl triethyl ammonium chloride, vinylbenzyl triethyl ammonium chloride, and vinylbenzyl pyridinium chloride. It will be appreciated that mixtures of positional isomers can be utilized. A preferred mixture is a mixture of para and meta isomers, predominantly para, having the following structure:

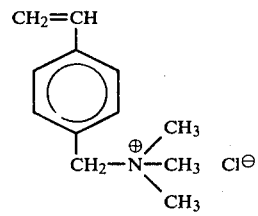

The vinylpyridine comonomer utilized in the process of the invention can include any of the pyridines having a vinylic substituent. Thus, 2-vinylpyridine, 3-vinylpyridine and 4-vinylpyridine can be utilized. Alkyl-substituted vinylpyridines can also be utilized, e.g., 2-methyl-5-vinylpyridine. A mixture of vinylpyridine compounds can also be utilized.

The ratio of vinylpyridine monomer to vinylbenzyl quaternary ammonium salt monomer can vary depending upon the desired properties of the resulting copolymer. In general, the ratio of vinylpyridine monomer to vinylbenzyl quaternary ammonium salt will vary within the range of from about 0.1:1 to about 10:1. Preferably, the relative proportions of vinylpyridine and vinylbenzyl quaternary ammonium salt comonomers will be such that the molar ratio of such respective monomers is from about 0.3:1 to about 3:1. In general, such ratios will be preferred from the standpoint of the provision of copolymers of desired solubility, coatability and mordanting properties. The process of the invention is especially useful for the production of a solution of a copolymer having the following structure wherein the molar ratio of a to b is from about 0.3:1 to about 3:1; each of $R^1$, $R^2$ and $R^3$ is methyl; and X is chloride.

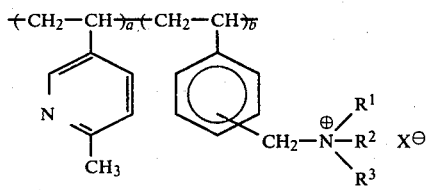

The polymerization process of the present invention can be effected by suitably initiating the polymerization of a solution of the copolymerizable monomers in the aqueous alcohol medium hereof. The polymerization can be initiated chemically, as by the utilization of a suitable free-radical polymerization initiator or redox initiator. Suitable free-radical polymerization initiators include the water-soluble or alcohol-soluble azo-type initiators such as azobisisobutyronitrile, 4,4-azobis-(4-cyanovaleric acid), diazoaminobenzene and 2,2'-azobis(2-amidinopropane)hydrochloride. Suitable redox-type polymerization initiators include a combination of a reducing agent such as sodium bisulfite, ascorbic acid or a ferrous salt and an oxidizing agent such as benzoyl peroxide, ammonium persulfate, hydrogen peroxide, diacetyl peroxide, t-butyl hydroperoxide or an alkali metal persulfate. The amount of catalyst employed can be varied to suit particular needs. Generally, from about 0.1% to about 5% by weight of the copolymerizable monomers will suffice. Normally, satisfactory polymerization reactions will be conducted over a temperature range of from about 25° C. to about 100° C. utilizing less than about 1% by weight of the initiator.

The polymeric materials prepared by the process hereof can be suitably recovered from solution, if desired, by conventional solvent removal technique, for example, by solvent evaporation. In many applications, e.g., in the provision of polymeric coatings, the solution provided by the conduct of the present invention can be utilized as a coating composition, or by the addition of other desired agents or components, can be utilized in the coating of various substrate materials. Typically, a solution of copolymer prepared by the process of the present invention, and having a solids content in the range of from about 8% to 25% by weight, can be conveniently utilized for the production of copolymeric films. The preparation of a solution, in contrast to a suspension subject to polymer instability and phase separation, provides an effective means for the handling, measurement, dispensing and uniform coating of the polymeric material and, thus, constitutes an advantageous aspect of the process of the invention.

The following examples are illustrative of the present invention and it will be understood that the invention is not limited thereto. All parts and percentages are by weight, except as otherwise indicated. In each of EXAMPLES I to IV hereof, the vinylbenzyl trimethyl ammonium chloride monomer utilized in the polymerization was a mixture predominantly of para and meta isomers and containing a small content of ortho isomer. Accordingly, the structures provided in the examples as indicative of the structure of recurring units from vinylbenzyl trimethyl ammonium chloride reflect the utilization of such a mixture of positional isomers.

EXAMPLE I

Into a 1000-ml. round-bottomed, three-necked flask (equipped with a mechanical stirrer, a thermometer and a refluxing condenser) were added 136.6 grams of 3 A ethanol (95% ethanol denatured with methanol), 107.3 grams (0.9 mole) 2-methyl-5-vinylpyridine and 63.5 grams (0.3 mole) of vinylbenyzl trimethyl ammonium chloride. The contents of the flask were stirred until formation of a solution and 546.6 grams of water were added. The resulting solution was sparged for 15 minutes with a flow of nitrogen. The solution was then heated to a temperature of 65° C. under a nitrogen atmosphere provided via the reflux condenser. To the flask was then added 854 milligrams of 4,4-azobis-(4-cyanovaleric acid). The reaction mixture was slowly stirred for 16 hours. Additional water (854 grams) was added to the resulting product to provide a solution of 3:1 mole ratio copolymer of 2-methyl-5-vinylpyridine and vinylbenzyl trimethyl ammonium chloride at a solids content of 10% by weight. The copolymer had the following structure:

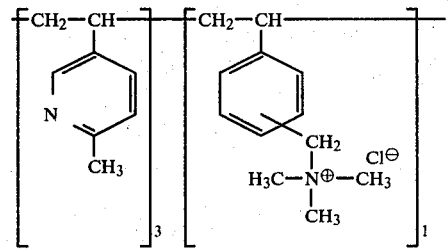

EXAMPLE II

For purposes of comparison with the copolymeric product of EXAMPLE I, a copolymer (2.6:1 mole ratio) of 2-methyl-5-vinylpyridine and vinylbenzyl trimethyl ammonium chloride was prepared in water without the added presence of ethanol. The copolymer was prepared in the following manner.

Into a 1000-ml. round-bottomed, three-necked flask (equipped with a mechanical stirrer, a thermometer and a refluxing condenser) were added 31.53 grams (0.26 mole) of 2-methyl-5-vinylpyridine, 21.17 grams (0.10 mole) of vinylbenyzl trimethyl ammonium chloride and 200.8 grams of water. The contents of the flask were stirred with formation of a two-phase mixture. The resulting mixture was sparged for 15 minutes with a flow of nitrogen. The solution was then heated to a temperature of 65° C. under a nitrogen atmosphere provided via the reflux condenser. To the flask was then added 254 milligrams of 4,4-azobis-(4-cyanovaleric acid). The reaction mixture was slowly stirred for 20 hours. Upon completion of the polymerization, additional water (253.5 grams) was added to the resulting product to provide a milky, viscous polymeric fluid containing a 2.6:1 mole ratio copolymer of 2-methyl-5-vinylpyridine and vinylbenzyl trimethyl ammonium chloride at a solids content of 10.39% by weight. Analysis for residual 2-methyl-5-vinylpyridine monomer indicated 99.89% conversion while analysis for residual vinylbenzyl trimethyl ammonium chloride indicated 99.52% conversion. The polymeric product was allowed to stand with the result that a phase separation occurred providing a milky suspension and a white polymeric precipitate.

EXAMPLE III

For purposes of additional comparison with the product prepared in the manner set forth in EXAMPLE I, the procedure of EXAMPLE II was repeated except that (1) the polymerization was conducted utilizing the following ingredients in the stated amounts and (2) no additional water was added upon completion of the polymerization:
189.18 grams (1.59 moles) 2-methyl-5-vinylpyridine;
127.02 grams (0.60 mole) vinylbenzyl trimethyl ammonium chloride;
1264.8 grams water; and
2.184 grams 4,4'-azobis-(4-cyanovaleric acid)initiator.

The resulting polymeric product was a viscous, milky suspension comprising the copolymer (2.6:1 mole ratio) of 2-methyl-5-vinylpyridine and vinylbenzyl trimethyl ammonium chloride at a solids content of 20% by weight. Analysis of the polymeric product for residual monomer content confirmed quantitative polymeric conversion. A portion of the milky product was subject to dialysis utilizing an osmotic membrane and sufficient water was added to provide a solids level of 10% by weight with the result that the product still exhibited a milky appearance.

EXAMPLE IV

This example illustrates the utilization of an aqueous alcohol polymerization medium for the preparation of a copolymer (0.5:1 mole ratio) of 2-methyl-5-vinylpyridine and vinylbenzyl trimethyl ammonium chloride.

Into a 1000-ml. round-bottomed, three-necked flask (equipped with a mechanical stirrer, a thermometer and a refluxing condenser) were added 65.2 grams of 3 A ethanol (95% ethanol denatured with methanol), 35.8 grams (0.3 mole) 2-methyl-5-vinylpyridine and 127.1 grams (0.6 mole) of vinyl benzyl trimethyl ammonium chloride. The contents of the flask were stirred until formation of a solution and 586.4 grams of water were added. The resulting solution was sparged for 15 minutes with a flow of nitrogen. The solution was then heated to a temperature of 65° C. under a nitrogen atmosphere provided via the reflux condenser. To the flask was then added 814 milligrams of 4,4-azobis-(4cyanovaleric acid). The reaction mixture was slowly stirred for 16 hours. Additional water (814.5 grams) was added to the resulting product to provide a solution of a copolymer (0.5:1 mole ratio) of 2-methyl-5-vinylpyridine and vinylbenzyl trimethyl ammonium chloride at a solids content of 10% by weight. The resulting product was a clear solution comprising the copolymer having the following structure:

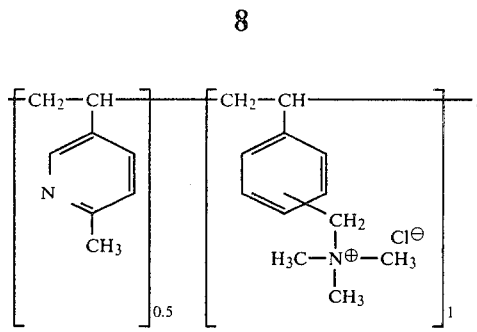

EXAMPLE V

This example illustrates the utilization of an aqueous alcohol polymerization medium for the preparation of a copolymer (3:1 mole ratio) of 4-vinylpyridine and vinylbenzyl trimethyl ammonium chloride.

Into a 1000-ml. round-bottomed, three-necked flask (equipped with a mechanical stirrer, a thermometer and a refluxing condenser) were added 125.8 grams of 3 A ethanol (95% ethanol denatured with methanol), 93.8 grams (0.9 mole) of distilled 4-vinylpyridine and 63.5 grams (0.3 mole) of vinylbenzyl trimethyl ammonium chloride. The contents of the flask were stirred until formation of a solution and 503.4 grams of water were added. The resulting solution was sparged for 15 minutes with a flow of nitrogen. The solution was then heated to a temperature of 65° C. under a nitrogen atmosphere provided via the reflux condenser. To the flask was then added 786.5 milligrams of 4,4'-azobis-(4-cyanovaleric acid). The reaction mixture was slowly stirred for 16 hours. The resulting product was a clear solution of the copolymer (3:1 mole ratio) of 4-vinylpyridine and vinylbenzyl trimethyl ammonium chloride at a solids content of 20% by weight. The copolymer had the following structure:

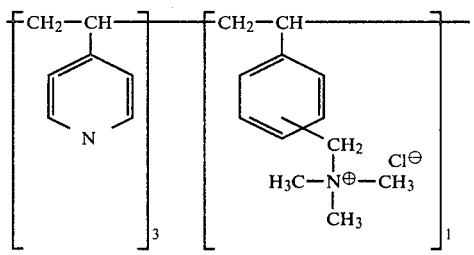

What is claimed is:
1. A process which comprises: forming a solution, in a solvent medium comprising water and a lower alcohol, of a mixture of copolymerizable monomers comprising a vinylpyridine and an ethylenically-unsaturated copolymerizable vinylbenzyl quaternary ammonium salt having the formula:

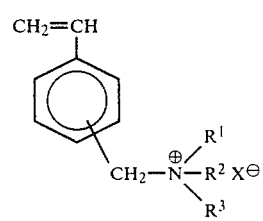

wherein each of $R^1$, $R^2$ and $R^3$ is independently alkyl; substituted alkyl; cycloalkyl; aryl; aralkyl; alkaryl; or at least two of $R^1$, $R^2$ and $R^3$ together with the quaternary nitrogen atom to which they are bonded complete a saturated or unsaturated, substituted or unsubstituted nitrogen-containing heterocyclic ring; and X is an anion; and polymerizing said mixture of copolymerizable monomers in said solvent medium, thereby to form a solution of a copolymer of said copolymerizable monomers in said solvent medium.

2. The process of claim 1 wherein the ratio of water to alcohol of said solvent medium is in the range of from about 0.5:1 to about 9:1 by weight.

3. The process of claim 2 wherein said ratio is in the range of from about 2:1 to about 5:1.

4. The process of claim 1 wherein said lower alcohol is selected from the group consisting of methanol, ethanol, isopropanol or a mixture thereof.

5. The process of claim 1 wherein said lower alcohol is ethanol and the ratio of water to ethanol is about 4:1 by weight.

6. The process of claim 1 wherein said mixture of copolymerizable monomers comprises said vinylpyridine and said ethylenically-unsaturated copolymerizable vinylbenzyl quaternary ammonium salt in a molar proportion, respectively, of from about 0.1:1 to about 10:1.

7. The process of claim 6 wherein said molar proportion is in the range of from about 0.3:1 to about 3:1.

8. The process of claim 1 wherein said ethylenically-unsaturated copolymerizable vinylbenzyl quaternary ammonium salt has the formula:

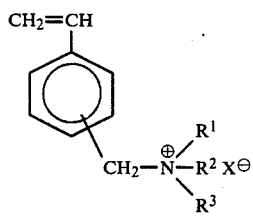

wherein each of $R^1$, $R^2$ and $R^3$ is alkyl and X is halide.

9. The process of claim 1 wherein said ethylenically-unsaturated copolymerizable vinylbenzyl ammonium salt has the formula:

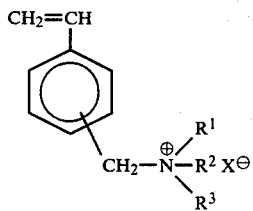

wherein each of $R^1$ and $R^2$ is alkyl, $R^3$ is cyclohexyl and X in an anion.

10. The process of claim 1 wherein said ethylenically-unsaturated copolymerizable vinylbenzyl ammonium salt comprises a mixture having the formulas:

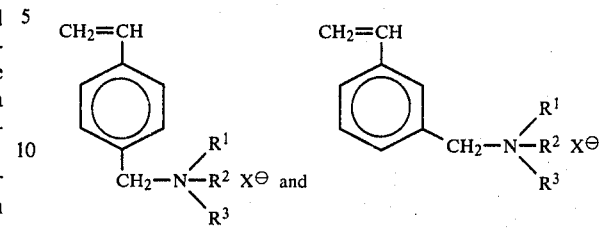

wherein each of $R^1$, $R^2$ and $R^3$ is alkyl and X is halide.

11. The process of claim 10 wherein each of said $R^1$, $R^2$ and $R^3$ is methyl and X is chloride.

12. The process of claim 1 wherein said vinylpyridine is selected from the group consisting of 2-vinylpyridine, 3-vinylpyridine, 4-vinylpyridine and 2-methyl-5-vinylpyridine.

13. The process of claim 12 wherein said vinylpyridine comprises 2-methyl-5-vinylpyridine.

14. The process of claim 12 wherein said vinylpyridine comprises 4-vinylpyridine.

15. The process of claim 1 wherein said mixture of copolymerizable monomers comprises a mixture of 2-methyl-5-vinylpyridine and vinylbenzyl trimethyl ammmonium chloride in a molar ratio, respectively, of from about 0.3:1 to about 3:1.

16. The process of claim 1 wherein said polymerization is initiated by a redox-type or azo-type polymerization initiator.

17. The process of claim 1 wherein said polymerization initiator is employed in an amount of from about 0.1% to about 5% by weight of said mixture of copolymerizable monomers.

18. The process of claim 17 wherein said polymerization initiator comprises azobis cyanovaleric acid.

19. The process of claim 1 wherein said mixture of copolymerizable monomers consists essentially of 2-methyl-5-vinylpyridine and vinylbenzyl trimethyl ammonium chloride in a molar ratio, respectively, of about 3:1.

20. The process of claim 19 wherein said solvent medium comprises water and ethanol.

21. The process of claim 1 wherein said mixture of copolymerizable monomers consists essentially of 2-methyl-5-vinylpyridine and vinylbenzyl trimethyl ammonium chloride in a molar ratio, respectively, of about 0.5:1.

22. The process of claim 21 wherein said solvent medium comprises water and ethanol.

23. The process of claim 1 wherein said mixture of copolymerizable monomers consists essentially of 4-vinylpyridine and vinylbenzyl trimethyl ammonium chloride in a molar ratio, respectively, of about 3:1.

24. The process of claim 23 wherein said solvent medium comprises water and ethanol.

* * * * *